3,109,837
HOMOPOLYMERIZATION OF VINYL ACETATE
Robert Lockheed, Cambridge, Mass., and Saburo Yamane, Toyama, and Kyoei Harada and Yukio Nishimatsu, Toyama-shi, Japan; said Yamane, Harada, and Nishimatsu assignors to Kurashiki Rayon Co., Ltd., Okayama, Japan, a corporation of Japan; said Lockheed assignor to Air Reduction Company Incorporated, New York, N.Y., a corporation of New York
Filed June 3, 1960, Ser. No. 33,751
Claims priority, application Japan June 5, 1959
2 Claims. (Cl. 260—89.1)

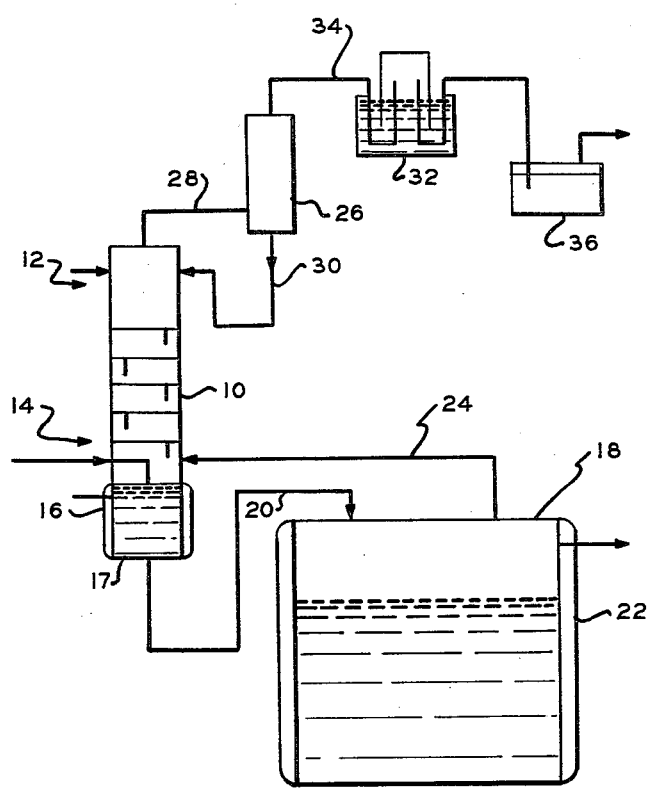

This invention relates to the preparation of polyvinyl acetate. More particularly, this invention relates to a method for polymerizing vinyl acetate.

Vinyl acetate monomer typically contains dissolved therein oxygen which decreases the rate of polymerization of the vinyl acetate monomer. Thus, the presence of oxygen in the vinyl acetate monomer decreases the capacity of the vessel in which the polymerization is conducted. Therefore, it is advantageous to remove a substantial portion of the oxygen prior to polymerization.

In order to remove the oxygen which is dissolved in the vinyl acetate monomer prior to polymerization, the vinyl acetate monomer may be preheated and purged with an inert gas such as nitrogen. In a conventional preheating method, heat is applied by an external source to the preheater and a purge gas such as nitrogen is blown through the preheater.

It is an object of the present invention to remove the oxygen from the vinyl acetate monomer without the use of an external heat supply and external source of inert gas.

Vinyl acetate may be polymerized by heating the monomer in the presence of a catalyst such as peroxides or azo compounds such as the symmetrical azonitrile, particularly alpha,alpha'-azobisisobutylonitrile. It is also convenient to employ a solvent such as methanol. The relative proportions of methanol to vinyl acetate and of the catalyst to vinyl acetate will vary depending upon the viscosity of the polymer desired. Increased quantities of catalyst and methanol in relation to vinyl acetate and polymerization to a high percent conversion, e.g. 70 to 80 percent led to a lower viscosity polymer, whereas decreased quantities of catalyst and solvent and lower percent conversions led to increased polymer viscosities. As a result, the viscosity of the polymer may be directly controlled by suitable control of the quantity of catalyst and solvent in relation to vinyl acetate polymerized and the percent conversion. The quantity of methanol in weight percent based on unit weight of vinyl acetate may vary from 0 to 125 percent and the quantity of catalyst may vary from 0.005 percent to 1.0 percent. Furthermore, different catalysts are effective in different quantities. Generally, four times as much peroxide catalyst is required as compared with the quantity of azo catalyst.

In the method of the present invention, the components of the polymerization mixture, that is, the vinyl acetate, solvent, if desired, and catalyst are introduced into a preheating zone. In the initial stage of operation the preheater is operated in the conventional manner with heating being supplied through an external source and inert gas such as nitrogen is employed. The vinyl acetate-catalyst-solvent mixture is thus preheated and purged with the inert gas to remove the dissolved oxygen and the preheated mixture is removed and carried to the polymerization zone where the polymerization is conducted. After the initial stage of operation, the external source of heat and inert gas which was applied to the preheater may be discontinued and the vinyl acetate monomer mixture preheated in the following manner. The vinyl acetate monomer mixture in the polymeriaztion zone is polymerized under reflux conditions. Thus, the vapors of the solvent and the nitrogen gas obtained from the decomposition of the azo catalyst or the carbonic acid gas obtained from the decomposition of the peroxide catalyst are removed from the polymerization zone and passed through the preheater, thus, supplying both heat and a purge gas to the preheater. Thus, after the initial stage of the polymerization it is possible by the method of the present invention to discontinue the supply of the inert gas to the preheating zone.

The invention is further illustrated by the accompanying FIGURE which is a schematic flow diagram presented for the purpose of illustrating the present invention. It is not intended to limit the invention specifically thereto.

In the figure, 10 is an oxygen purging preheater. The vinyl acetate, solvent, and catalyst enter preheater 10 through line 12 and the vinyl acetate monomer is initially deoxidized with nitrogen gas which enters preheater 10 at inlet 14 located at the lower portion of the preheater as the vinyl acetate monomer, solvent, and catalyst move downwardly through the oxygen preheater. An external heat supply such as hot water is circulated in jacket 16. The vinyl acetate monomer, solvent, and catalyst are collected in the bottom portion 17 of preheater 10 and fed from the preheater into polymerizing tank 18 by means of line 20. The amount of nitrogen gas blown in and the temperature and quantity of the recirculating hot water are controlled in proportion to the composition ratio and the amount of vinyl acetate solution charged into the preheater. The vinyl acetate monomer, solvent and catalyst may enter the preheater at room temperature or may enter at a somewhat higher temperature, if desired.

The initial polymerization reaction is carried out by supplying a source of heat to the polymerization zone 18 such as by means of a hot water jacket 22. When the polymerization reaction attains the prescribed rate and the polymerization is progressing continuously, the heat source for the preheater and the external supply of nitrogen may be discontinued. When the nitrogen and external heat source are discontinued, the vinyl acetate monomer, solvent, and catalyst being fed into the preheater from inlet 12 are freed from the oxygen dissolved therein and preheated by the vapors and gases which are removed from the polymerization zone through line 24 and which enter the preheater 10 near the bottom. The gases and vapors are obtained by the decomposition of the polymerization catalyst and from the vapor of the solvent. The vapors and gases pass through the oxygen purging preheater and enter condenser 26 through line 28. The condensate which is recovered in the condenser 26 is recirculated to the top of the oxygen purging preheater 10 through line 30. The noncondensible gases are emitted from the top of the condenser 26 and enter waste gas holder 32 through line 34. The noncondensible gases are subsequently exhausted through water bubbling tank 36 in order to prevent the countercurrent flow of oxygen.

In order to operate the present invention it is necessary to conduct the polymerization at a minimum rate of polymerization for the particular system being employed. Where a composition of 80 parts vinyl acetate, 20 parts methanol, and 0.03 percent of alpha,alpha'-azobisisobutyronitrile by weight of solution are fed to the oxygen purging preheater at a temperature of 20° C. and the vinyl acetate methanol solution is preheated to a temperature of 60° C. prior to feeding to the polymerization tank, the heat balance will be in a state of equilibrium where the polymerization is conducted at a rate of 9.9 percent, assuming the heat loss of the vapor solution to be 10 percent. In other words, if the polymerization is conducted at a rate of greater than 9.9 percent, the polymerization process may be conducted without the use of any external source of heat being supplied to the preheater.

Where the solution being introduced into the preheater is composed of 50 parts vinyl acetate, 50 parts methanol, and 0.05 percent by weight of dimethyl-2,2'-azodiisobutylate at a temperature of 20° C. and the solution is preheated to a temperature of 60° C. prior to being fed into the polymerization zone, the heat balance will be in the state of equilibrium where the polymerization is conducted at the rate of 18 percent, assuming the heat loss of the vapor of the solution to be 10 percent. Thus, under the above conditions if the polymerization is conducted at the rate of polymerization of at least 18 percent, a continuous operation may be conducted without external heating.

The following specific examples will serve to more fully illustrate the invention; however, it will be understood that these examples are illustrative only and are not to be considered as limitative of the invention.

Example 1

136 kilograms per hour of vinyl acetate, 34 kilograms per hour of methanol and 0.03 percent of 2,2'-azoisobutylonitrile based on the weight of solution were added to preheater 10 at inlet 12 at a temperature of 20° C. The vinyl acetate, methanol, and catalyst solution were preheated to a temperature of 60° C. and the solution charged into polymerization zone 18. The polymerization was continuously operated at the rate of 15 percent. The vapors and the gases from the polymerization zone were recirculated through line 24 and to the purging preheater 10, through purging preheater 10 in a countercurrent flow with relation to the flow of vinyl acetate monomer solution and entered condenser 26 through line 28. The temperature at the top of the oxygen purging preheater was 60° C. and the temperature at the tower head of condenser 26 was 25° C. The oxygen dissolved in the vinyl acetate monomer which was fed into the oxygen purging preheater was $1.0 \times 10^{-3}$ moles per liter. The oxygen dissolved in the mixture which was fed to the polymerization was $5.0 \times 10^{-5}$ moles per liter. The output of waste gas to the waste gas holder 32 was 27 liters per hour and its composition was comprised of 9 percent oxygen and 86 percent nitrogen.

Example 2

70 kilograms per hour of vinyl acetate, 70 kilograms per hour of methanol and 0.05 percent of dimethyl-2,2'-azoisobutylate based on the weight of solution were charged to the oxygen purging preheater at 20° C. The vinyl acetate solution was preheated to 60° C. and charged into the polymerization zone. The polymerization was continuously conducted at the rate of 30 percent. The gases and vapors from the polymerization zone were preheated and the temperature at the top of the oxygen preheater was 60° C. with the temperature at the tower head of the condenser 26° C. The oxygen dissolved in the vinyl acetate solution which was fed into the oxygen purging preheater was $0.9 \times 10^{-3}$ moles per liter and the oxygen dissolved in the vinyl acetate solution which was fed into the polymerization zone was $4.5 \times 10^{-5}$ moles per liter. The output of waste gas to the waste gas holder was 21 liters per hour and the waste gas was composed of 8.5 percent oxygen and 88 percent nitrogen.

We claim:

1. A process for homopolymerizing vinyl acetate which comprises passing a liquid mixture consisting of vinyl acetate monomer, a solvent for said monomer, and a polymerization catalyst downwardly through a preheating zone consisting of an elongated countercurrent gas-liquid contact zone, said catalyst being a symmetrical azonitrile capable of effecting polymerization of vinyl acetate and concurrently liberating nitrogen when heated with monomeric vinyl acetate in a solvent, during the initial stage of operation supplying heat and inert gas from an external source to said preheating zone to heat said liquid mixture and said inert gas and passing the heated inert gas upwardly through said preheating zone in gas-liquid contact with said mixture to remove oxygen from said monomer, transferring said preheated liquid mixture consisting of vinyl acetate monomer from which oxygen has been removed, solvent and polymerization catalyst into a polymerization zone separate and distinct from said preheating zone, polymerizing vinyl acetate in said liquid mixture at reflux temperature in said polymerization zone thereby causing the evolution from said polymerization zone of gases at elevated temperature including solvent vapors at substantially said reflux temperature, after the initial stage of operation discontinuing the said supply of heat and inert gas from an external source to said preheating zone, transferring the evolved gases at elevated temperature from said polymerization zone to said preheating zone, passing said gases upwardly through said preheating zone in countercurrent contact with said liquid mixture containing vinyl acetate monomer to preheat said mixture and remove oxygen from said monomer, said gases providing the sole source of heat and the sole means for removing oxygen from said liquid mixture after the discontinuance of said externally supplied heat and inert gas.

2. In the continuous process for the homopolymerization of vinyl acetate wherein a feedstock comprising monomeric vinyl acetate having oxygen dissolved therein is preheated and purged with gas to remove oxygen therefrom in a preheating zone and in which the said monomeric vinyl acetate is thereafter polymerized in a polymerization zone in a solvent in the presence of a catalyst selected from the group consisting of azo compounds and peroxides capable of effecting the polymerization of vinyl acetate and concurrently liberating a gaseous decomposition product when heated with monomeric vinyl acetate in a solvent, the improvement which comprises initiating said polymerization process to cause off-gases comprising vapors of said solvent and gaseous products of decomposition of said catalyst to be evolved at elevated temperature from said polymerization zone and thereafter utilizing the said elevated temperature polymerization off-gases as the sole source of heat and purge gas in said preheating zone to preheat said feedstock and remove oxygen from the monomeric vinyl acetate contained therein by passing the said off-gases in countercurrent gas-liquid contact with the said incoming feedstock.

References Cited in the file of this patent

UNITED STATES PATENTS 2,694,700     Shanta _____ Nov. 16, 1954